Dec. 9, 1952     C. R. BOOTHBY     2,620,503
WINDSHIELD WIPER ARM AND BLADE CONNECTION
Filed Sept. 10, 1947
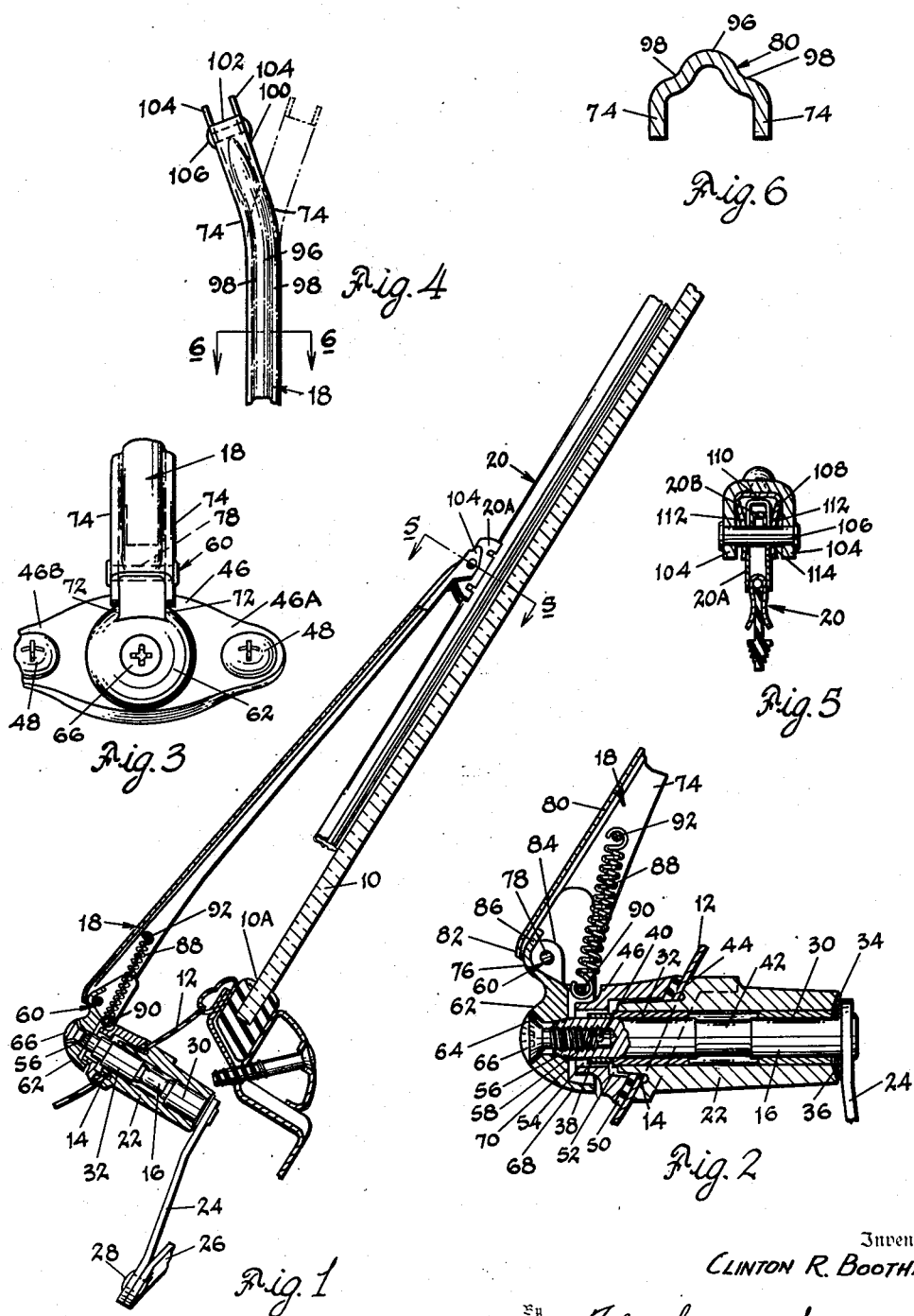
Inventor
CLINTON R. BOOTHBY
By Falvey, Souther & Stoltenburg
Attorneys Patented Dec. 9, 1952

2,620,503

UNITED STATES PATENT OFFICE 2,620,503

WINDSHIELD WIPER ARM AND BLADE CONNECTION

Clinton R. Boothby, Toledo, Ohio

Application September 10, 1947, Serial No. 773,092

2 Claims. (Cl. 15—250)

This invention relates to windshield wiper arms and improvements thereof.

This invention contemplates the provision of a windshield wiper arm which is generally channel-shaped in form, which is provided with an additional bead in the web of the channel section to give maximum stiffness in planes normal and parallel to the surface which is to be wiped. The provision of the bead gives the effect of a double channel which enhances the stiffness of the arm and yet gives the arm a conformation which is pleasing to the eye of an observer.

Furthermore, the use of the channel-shaped arm portion allows the use of a pivot-member for connecting the arm to an oscillating shaft which smoothly conforms to the general design to give an overall assembly which is pleasing to the eye and yet is strong and reliable for the purpose intended. Similarly, this shape of the arm allows the addition of a convenient means for attaching the blade element thereto, still further carrying out the general design consistently.

Furthermore, the use of an arm of channel-shaped conformation allows better control of the tension of the resilient members as reflected in the pressure of the wiper blade on the windshield, inasmuch as it may not be bent out of shape by an operator, so that a resilient means may be used in connection therewith which has been carefully calibrated initially and will substantially retain this calibration for the full life of the arm.

It is, therefore, a principal object of the invention to provide a windshield wiper arm having a channel-shaped conformation from its pivotal connection adjacent the oscillating shaft to the point at which the wiper blade is attached, to give maximum rigidity in planes normal to and parallel with the surface to be wiped by the blade.

It is a further object of this invention to provide a windshield wiper arm which has smooth flowing lines continuous from the pivotal connection to the wiper blade to make a pleasing impression on the eye of an observer.

It is a further object of this invention to provide a windshield wiper arm which will be easily manufactured and which will retain its initial blade pressure characteristic for substantially the life of the arm.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views:

Referring to the drawings:

Fig. 1 is an elevational view, in section, of a motor car windshield incorporating the invention;

Fig. 2 is an enlarged elevational view, in section, of the pivotal connection for operating the windshield wiper arm;

Fig. 3 is a plan view of the pivotal connection;

Fig. 4 is a plan view of the tip of the windshield wiper arm;

Fig. 5 is an elevational view, in section, showing a wiper blade positioned on the arm and is taken along the lines 5—5 of Fig. 1 and Fig. 6 is a sectional elevation taken along the lines 6—6 of Fig. 4.

Referring now to Fig. 1, a glass windshield 10 is shown mounted in rubber at the rearward edge of a cowl member 12 which extends forwardly from the windshield being provided with an aperture 14, through which projects an oscillating shaft 16 to drive a windshield wiper arm 18 which, in turn, oscillates a blade member 20 in an arc across the forward face of the windshield 10 to remove therefrom accumulations of moisture precipitated from the atmosphere. The windshield 10 is mounted in a manner to extend rearwardly at an angle with the vertical as is shown in Fig. 1 and the oscillating shaft 16 is preferably maintained in a substantially normal relation to the windshield 10 by a bearing sleeve 22 and through which the oscillating shaft projects so as to extend on either side of the aperture 14 in the cowl member 12.

The oscillating shaft 16 has attached to it, in normal relation at its rear end, an arm 24 by means of riveting or the like, so that the arm 24 may apply torque to cause oscillatory rotation of the shaft 16. At the lower end of the arm 24, a link member 26 is attached by means of a rivet 28 which allows relative movement between the arm 24 and the link 26. The link 26 is connected to a driving motor (not shown) in a manner well known in the art, which need not be described in further detail. The driving motor, through the agency of the link 26, oscillates the arm 24, the shaft 16, the arm 18, and the blade 20, positioned on the windshield 10 in a predetermined arc, dependent upon the ratios in the system. It is usually desirable to oscillate the blade 20 through an angle of at least 95 degrees on the windshield 10 in order to clear the windshield of precipitated moisture or the like to allow an operator of the automobile to see the road clearly while driving the vehicle.

The bearing sleeve 22 is preferably made of die-cast material and is provided at its ends with suitable bearing bushings 30 and 32 which are press-fitted into the bore of the sleeve. The shaft 16 is inserted into the sleeve 22 through the bushings 30 and 32 from the rear side, being provided with a spring washer 34 to cooperate with the dished rear face 36 of the sleeve 22. When the shaft 16 is in operative position in the sleeve 22, the spring washer 34 is slightly depressed to fit into the dished portion 36 and thereby places an end thrust at all times upon the shaft 16 tending to move it toward the right, as shown in Fig. 2. After the shaft 16 has been inserted into the sleeve 22, it is held in position therein by means of a collar 38 attached to the forward projecting end of the shaft by means of a rivet 40 which is fitted to extend through the collar 38 and a transverse aperture in the shaft 16. The collar 38 abuts against the forward end of the bearing sleeve 22 by the resilient action of the spring washer 34 as has already been described. The shaft 16 may be provided, adjacent its central portion, with an undercut 42 positioned between the bushings 30 and 32 which may facilitate the oiling of the shaft in its oscillatory rotation in the bushings.

Adjacent the forward bushing 32, the sleeve 22 is provided with an oblique external shoulder 44 which is utilized to cooperate with the inner surface of the cowl member 12 and held thereagainst by means of a cap member 46 on the outside of the cowl 12 which is provided with laterally extending oblique flanges 46A and 46B having apertures in which are positioned screws 48. The screws extend through a gasket member 50 between the cap member and the cowl and through aligning apertures in the cowl to thread into threaded apertures in the laterally enlarged shoulders 44 in the sleeve member 22. This construction firmly holds the sleeve member 22 in position in the cowl 12 in a manner, so that the shaft 16 is firmly held in normal relation to the windshield 10 for the purposes already described. The gasket member 50 provides a weather-seal for the assembled pivot means.

The cap member 46 is provided with internal cavities 52 and 54 which house the forwardly projecting portion of the sleeve 22 extending above the cowl 12 and the collar member 38 on the shaft 16. The shaft 16 is of such a length that it extends a substantial distance beyond the forward terminating edge of the cap member 46, normal to the shaft 16, being provided with a tapering serrated portion 56 at its terminus. An axial aperture, which is threaded, is provided extending inwardly of the serrated portion.

The oscillating shaft 16, being provided with the serrated terminal portion 56 projecting from the aperture 14 of the cowl member 12, and also the terminus of the cap member 16, is adapted to drive the arm 18, which is provided at its lower end with a pivotal connection 60, comprising in part a hemispherical attachment member 62 of die-cast material, best seen in Fig. 3, having a centrally-located aperture 64, countersunk to seat the head of a screw 66 threaded into the threaded aperture 58 in the terminus of the shaft 16. The attachment member 62 is hollow to provide a skirt member 68 to over-hang the terminal portion of the cap member 46 to provide a weather-seal and also to provide a flat inner face 70 which is pierced by the central aperture 64 and tapered from the inner face 70 to the same angle as the serrated tapering portion 56 with which it cooperates, being pulled thereagainst by the action of the screw 66 to form a driving connection between the attachment portion 62 of the arm and the oscillating shaft 16 as driven by the motor.

The pivotal connection 60 of the arm member 18 further comprises an upwardly extending integral boss of the hemispherical attachment means 62, provided with parallel sides 72 which fit into and project a considerable distance along the inner surface of the sides 74 of the channel-shaped lower terminus of the arm 18. The upper surface of the boss is given a curved contour 76, the radius of which centers in the pivot connection formed about a pin 78 positioned in aligned apertures in the parts. To form a pleasing contour between the attachment means 62 and the channel of the arm 18, the terminating portion of the web 80 of the channel is given a cylindrical contour 82 which is of a slightly larger radius than the cylindrical portion 76, with which it cooperates. The parallel sides 72 extend a considerable distance in their inner parallel relation with the channel sides 74 to give additional support for the transfer of thrust from the attachment means to the channel 18, as is most clearly shown in Figs. 2 and 3. This additional support for the thrust transfer decreases the strain upon the pivotal connection 60 as centered in the pivotal pin 78. The side members 72 are reinforced by inner buttress members 84 integral with the sides 72 and also by a tangential portion 86 forming an extension of the cylindrical portion 76, already described.

In order to urge the arm 18 in a clockwise direction about its pivotal connection 60 formed about the pivot pin 76, a helical spring 88 is provided, having its lower end looped and anchored but adapted for pivotal rotation about an integral pin-like member 90 formed in the attachment means 62 in spaced relation behind and below the pivotal pin 78 to provide the necessary lever arm between the anchor pin 90, the pivotal pin 78, and a second anchor pin 92 positioned between the sides 74 of the channel-shaped member to which the opposite looped end of the helical spring is attached. The helical spring 82 is calibrated and selected for a predetermined strength, giving consideration to the aforementioned lever arms, whereby a predetermined thrust is provided adjacent the terminal end of the arm 18 to which the blade 20 is attached for cooperation with the windshield 10 in a manner to be described in detail hereinafter.

The arm portion 18 is of integral channel-shaped construction, having a web portion 80 and depending side portions 74, as has already been described with reference to the pivotal connection. The web portion 80 is given a contour, as is best illustrated in Fig. 6, wherein a longitudinal bead 96 is provided to give reverse curved portions 98 to join to the side 74 of the channel-shaped member. This gives, in effect, a double channel arrangement which greatly increases the rigidity of the arm portion between the pivotal connection 60 and the point at which the blade member 20 is attached to the arm. This rigidity, by this construction, is increased to a maximum, particularly in a direction normal to the windshield 10, in which direction the helical spring 88 applies its force to the blade 20 to maintain a predetermined pressure of the blade 20 against the windshield 10 to give most effective wiping action to the blade 20. Similarly when the oscillating shaft 16 rotates the whole arm about its axis, the forces acting parallel to the surface of the windshield 10 tending to rotate or oscillate the blade 20 are influenced by the rigidity of the arm. The vertical dimension having reference to the windshield 10 of the side portions 74 of the arm 18 are tapered, being widest adjacent the pivot pin 78 and tapering sharply to a point approximately one-fourth of the length from the lower end and thereafter tapering gradually to the end at which the blade 20 is attached.

If desired, the terminating tip of the arm member 18 may be given a lateral displacement 100 adjacent its tip portion to provide a means whereby the blade 20 may be maintained in parallel relation with the bottom edge 10A of the windshield while it is parked thereagainst. This angular displacement 100 will be in opposite directions to allow parallel parking of the blades 20 at the two sides of the windshield, either of the sectional type or of a curved type, as is well known in the art and shown in phantom in Fig. 4.

The longitudinal bead 96 terminates a short distance from the distal terminal edge 102 of the web 80, the sides 74 extending forwardly and downwardly to provide projecting portions 104, between which is positioned the wiper blade 20, as is best shown in Figs. 1 and 5. To attach the blade 20 to the arm member 18 between the terminal projecting portions 104, a transverse rivet 106 is provided positioned in apertures therein and riveted in fixed relation thereto. Between the projecting portions 104, a U-shaped spring member 108 is provided having a web portion 110 parallel to the inner side of the terminating portion 102 adjacent the rivet 106 and depending side portions 112 which are provided with enlarged apertures 114 embracing the rivet 106. The spring member 108 resiliently urges its depending side portions 112 inwardly to embrace the attaching means 20A of the blade member 20, as is best shown in Fig. 5. The attaching means 20A of the blade is preferably of a box-like construction, slightly smaller than and adapted to fit within the terminal portions 104 so as to embrace the rivet 106 and the lock therewith to hold the blade 20 permanently in position. A locking means 20B may be provided to cooperate with the rivet to lock the blade 20 in position but is removable therefrom at the will of the operator. When the attaching means 20A is positioned in the arm, the side members 112 of the spring 108 will resiliently bear against the sides thereof to hold it resiliently in position so as to prevent any looseness which, during the operation of the blade and arm, may cause a noisy, clicking sound which is undesirable.

I claim:

1. In a channel-shaped wiper arm having an upwardly extending longitudinal bead in the web thereof to increase the resistance to bending of the arm, the web at the point where a wiper blade is to be attached terminating in a flat portion into which the bead blends, a rivet extending across the channel and fitted into the side members thereof adjacent the flat portion of the web, a U-shaped spring member having a web portion adapted to fit within the channel of the arm in parallel juxtaposition to the flat portion thereon, and having side portions normally biased toward a central location having enlarged apertures to cooperate with the rivet which holds said spring member in position in the channel of the wiper arm, the outward expansion of said side portions of the spring member being limited by the channel sides.

2. In a channel-shaped wiper arm having a web and a pair of depending parallel sides, the web of the arm adjacent the point where a wiper blade is to be attached terminating in a transverse edge, a rivet extending across the channel and affixed into the side members thereof adjacent the terminating edge, a U-shaped spring member having a web portion adapted to fit within the channel of the arm in parallel juxtaposition to the web portion of the arm and having side portions normally biased toward a central location with enlarged apertures to cooperate with the rivet which holds the spring member in position in the channel of the wiper arm, the movement outwardly of said side portions being limited by the channel sides.

CLINTON R. BOOTHBY.

REFERENCES CITED

The following references are of record in the file of this patent:

UNITED STATES PATENTS

| Number | Name | Date |
|---|---|---|
| 1,070,676 | Frankhauser | Aug. 19, 1913 |
| 1,500,654 | Spiro | July 8, 1924 |
| 1,916,544 | Whitted | July 4, 1933 |
| 1,931,098 | Anderson | Oct. 17, 1933 |
| 2,269,623 | Ehrlich | Jan. 13, 1942 |